(12) United States Patent
Takanashi

(10) Patent No.: US 10,714,146 B2
(45) Date of Patent: Jul. 14, 2020

(54) RECORDING DEVICE, RECORDING METHOD, REPRODUCING DEVICE, REPRODUCING METHOD, AND RECORDING/REPRODUCING DEVICE

(71) Applicant: SONY CORPORATION, Tokyo (JP)

(72) Inventor: Shogo Takanashi, Tokyo (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/482,005

(22) PCT Filed: Mar. 1, 2018

(86) PCT No.: PCT/JP2018/007908
§ 371 (c)(1),
(2) Date: Jul. 30, 2019

(87) PCT Pub. No.: WO2018/168508
PCT Pub. Date: Sep. 20, 2018

(65) Prior Publication Data
US 2019/0392867 A1    Dec. 26, 2019

(30) Foreign Application Priority Data

Mar. 14, 2017 (JP) .................................. 2017-048188

(51) Int. Cl.
*G11B 27/30*     (2006.01)
*H04N 5/765*    (2006.01)
(Continued)

(52) U.S. Cl.
CPC ...... *G11B 27/3036* (2013.01); *G06K 9/00711* (2013.01); *H04N 5/765* (2013.01); *G06K 2209/01* (2013.01)

(58) Field of Classification Search
USPC ................................................ 386/239–248
See application file for complete search history.

(56) References Cited

U.S. PATENT DOCUMENTS

2004/0153969 A1* 8/2004 Rhodes ................... G06F 16/38
715/209
2015/0271446 A1* 9/2015 Browne .............. H04L 12/1827
348/14.08

FOREIGN PATENT DOCUMENTS

| JP | 2002-101398 A | 4/2002 |
| JP | 2005-167822 A | 6/2005 |
| JP | 2011-29852 A  | 2/2011 |

OTHER PUBLICATIONS

International Search Report dated May 29, 2018 in PCT/JP2018/007908 filed on Mar. 1, 2018.

* cited by examiner

*Primary Examiner* — Hung Q Dang
(74) *Attorney, Agent, or Firm* — Oblon, McClelland, Maier & Neustadt, L.L.P.

(57) ABSTRACT

It is possible for the viewer to readily and accurately reach a desired image/audio reproduction start position in reproduction.
A time code is added to moving image data obtained by imaging a state in which a person who writes a description is explaining while writing a description in a description portion and audio data corresponding to the moving image data to record the data in a recording unit. The moving image data is processed to determine a written portion written in the description portion, and index image data is generated to display each portion determined as the written portion as an index description, and the index image data is recorded in the recording portion. To the index image data, a value of the time code corresponding to description time is added as a timestamp, in association with each pixel constituting the index description.

16 Claims, 7 Drawing Sheets

(51) Int. Cl.
*G06K 9/00* (2006.01)
*H04N 5/77* (2006.01)
*H04N 5/91* (2006.01)
*H04N 5/232* (2006.01)

(a)

(b)

RECORDING DEVICE, RECORDING METHOD, REPRODUCING DEVICE, REPRODUCING METHOD, AND RECORDING/REPRODUCING DEVICE

TECHNICAL FIELD

The present technology relates to a recording device, a recording method, a reproducing device, a reproducing method, and a recording/reproducing device, and more particularly, to a recording device and the like for recording moving image data and audio data of a state in which a person who writes a description is explaining while writing a description in a description portion.

BACKGROUND ART

It is known to generate an index entry in conventional recording of image/sound of a state in which a person who writes a description is explaining while writing a description in a description portion. For example, in Patent Document 1, a method of generating an index entry is proposed, in which the index entry is generated when the writing of the person who writes a description is interrupted for a predetermined time. However, the index entry is not generated on the basis of the content of the writing by this method, and the index entry is not generated unless the writing is interrupted. Therefore, in reproduction, it is difficult for a viewer to reach a desired reproduction start position referring to the index entry.

CITATION LIST

Patent Document

Patent Document 1: Japanese Patent Application Laid-Open No. 2002-101398

SUMMARY OF THE INVENTION

Problems to be Solved by the Invention

An object of the present technology is to make it possible for a viewer to readily and accurately reach a desired image/audio reproduction start position in reproduction.

Solutions to Problems

A concept of the present technology is to provide
a recording device including:
an image/audio recording unit for adding a time code to moving image data obtained by imaging a state in which a person who writes a description is explaining while writing a description in a description portion, and audio data corresponding to the moving image data to record the data in a recording unit; and
an index-image recording unit for processing the moving image data, determining a written portion in the description portion, generating index image data for displaying, as an index description, portions determined as the written portion, and recording the index image data in a recording unit,
in which, to the index image data, a value of the time code corresponding to description time is added as a timestamp, in association with pixels constituting the index description.

In the present technology, the image/audio recording unit adds the time code to the moving image data obtained by imaging a state in which the person who writes a description is explaining while writing a description in the description portion is giving an explanation, and audio data corresponding to the moving image data and records the data in the recording unit.

The index-image recording unit processes the moving image data to determine the written portion written in the description portion. For example, the index-image recording unit may be configured to extract a difference value between a current frame image and a reference frame image for each pixel, grasp groups of a series of pixels having a difference value equal to or more than a threshold value, and determine whether each group has the written portion or not.

In this case, for example, the index-image recording unit may be configured to determine whether each group has the written portion or not by using a shape evaluation value, extraction time evaluation value, and stationary time evaluation value, and the index-image recording unit may be configured to determine the shape evaluation value on the basis of aspect ratios of a minimum square containing the group and a maximum square contained in the group, obtain the extraction time evaluation value on the basis of the value of a difference from the reference frame image, in a pixel included in the group, over a current frame and a plurality of frames prior to the current frame, and obtain the stationary time evaluation value on the basis of the value of a difference from a frame image of a preceding frame, in a pixel included in the group, over a current frame and a plurality of frames prior to the current frame.

The index-image recording unit generates index image data for displaying, as the index description, each portion determined as the written portion and records the index image data in the recording unit. This recording unit may be the same as or different from the recording unit for recording the moving image data and the audio data. Here, to the index image data, a value of the time code corresponding to description time is added as a timestamp, in association with each pixel constituting the index description.

For example, when an erased state of a written portion in the description portion is recognized more than a certain number of times for a fixed time period, the index-image recording unit may determine the index image data having been generated up to that point as one item of index image data and proceeds to a process of generating new index image data. Thus, each time a written portion in the description portion is erased in large by the person who writes a description, new index image data is generated.

As described above, in the present technology, moving image data is processed to determine portions as written portions, index image data for displaying the written portions as index descriptions is generated and recorded in the recording unit, and, to the index image data, the values of time codes corresponding to description time are added as timestamps, in association with pixels constituting the index descriptions. Thus, upon reproduction, the index image data is used to display an index image having an index description, and a viewer is able to specify an appropriate position on the basis of the content of an index description to readily and accurately reach an image/audio reproduction start position corresponding to description time corresponding to the specified position.

Note that, in the present technology, for example, the recording device may further include a character recognition unit to perform character recognition on an index description to recognize a word, in which the index image data may include data on this word in association with each pixel constituting the index description corresponding to the recognized word. Thus, upon reproduction, it is possible, for example, to obtain and display related information by using the data on the word recognized by the character recognition.

Furthermore, a concept of the present technology is to provide a reproducing device including:

an index-image display control unit for reading index image data from a recording unit to display, on an index-image display unit, an index image having an index description, on the basis of the index image data, the index image data including a value of a time code value, added as a timestamp, corresponding to description time in association with each pixel constituting the index description;

a user operation unit for specifying an appropriate position of an index description of an index image displayed on the display unit; and a reproduction control unit for controlling a reproduction start position in moving image data and audio data recorded in a recording unit on the basis of the timestamp added to the index image data in association with a pixel at the specified position.

In the present technology, the index-image display control unit reads index image data from the recording unit, and, on the basis of the index image data, an index image having an index description is displayed on the index-image display unit. Here, to the index image data, a value of the time code corresponding to description time is added as a timestamp, in association with each pixel constituting the index description. Moving image data and audio data are recorded with a time code, in the recording unit.

The user operation unit specifies an appropriate position of the index description of the index image displayed on the display unit. On the basis of a timestamp added to the index image data in association with a pixel at the specified position, the reproduction control unit controls a reproduction start position in the moving image data and audio data recorded in the recording unit.

For example, the reproduction control unit may be configured to display, as a still image, an image at the reproduction start position on a reproduced-image display unit, before starting reproduction. In this case, for example, the reproduction control unit may be configured to, when receiving a reproduction instruction from the user operation unit while an image at a reproduction start position is displayed as a still image on the reproduced-image display unit, start reproduction of the moving image data and the audio data, from the reproduction start position. In this case, the viewer is able to issue a reproduction instruction after confirming the image at the reproduction start position.

Furthermore, the reproduction control unit may be configured to display, on an image list display unit, thumbnail images of frames within a predetermined range including the reproduction start position while an image at a reproduction start position is displayed as a still image on the reproduced-image display unit. In this case, for example, when a predetermined thumbnail image is selected from the user operation unit, the reproduction control unit may change the reproduction start position to a position of a frame of this thumbnail image. In this case, the viewer can easily and appropriately change the reproduction start position with reference to the thumbnail images.

As described above, in the present technology, the index image having an index description is displayed on the basis of the index image data. Specifying an appropriate position in the index description controls the reproduction start position in the moving image data and the audio data recorded in the recording unit on the basis of the timestamp added to the index image data in association with a pixel at the specified position. Therefore, the viewer can specify an appropriate position on the basis of the content of an index description to readily and accurately reach an image/audio reproduction start position corresponding to description time corresponding to the specified position.

Note that, in the present technology, for example, in the reproducing device, in association with each pixel constituting an index description corresponding to a word recognized using character recognition, data on the word is added to the index image data, and the reproducing device further includes an information acquisition unit for acquiring, in association with a pixel corresponding to a position designated by the user operation unit, on the basis of data on a word added to the index image data, information relating to the word, in which the reproduction control unit displays the acquired information over the image at the reproduction start position.

Furthermore, in the present technology, for example, in the reproducing device, in association with each pixel constituting an index description corresponding to a word recognized using character recognition, data on the word is added to the index image data, and the reproduction control unit, and the reproduction control unit may be configured so that, together with a thumbnail image of a frame corresponding to the reproduction start position, while an image at a reproduction start position is displayed as a still image on the image display unit, displays, in an image list display unit, a thumbnail image at a position of a timestamp added in association with a pixel corresponding to another position with which data on a word the same as data on a word added in association with a pixel corresponding to the specified position is added in association. Then, in this case, when a predetermined thumbnail image is selected from the user operation unit, the reproduction control unit may change the reproduction start position to a position of a frame of this thumbnail image.

Effects of the Invention

According to the present technology, it is possible for the viewer to readily and accurately reach a desired image/audio reproduction start position in reproduction. It is noted that the effects described herein are by way of example only and not limited to the example, and may have further additional effects.

MODE FOR CARRYING OUT THE INVENTION

Modes for carrying out the invention (hereinafter, referred to as embodiments) will be described below. Note that the description will be given in the following order.

1. Embodiments
2. Modifications

1. Embodiments

Configuration Example of Recording/Reproducing System

Figure 1:
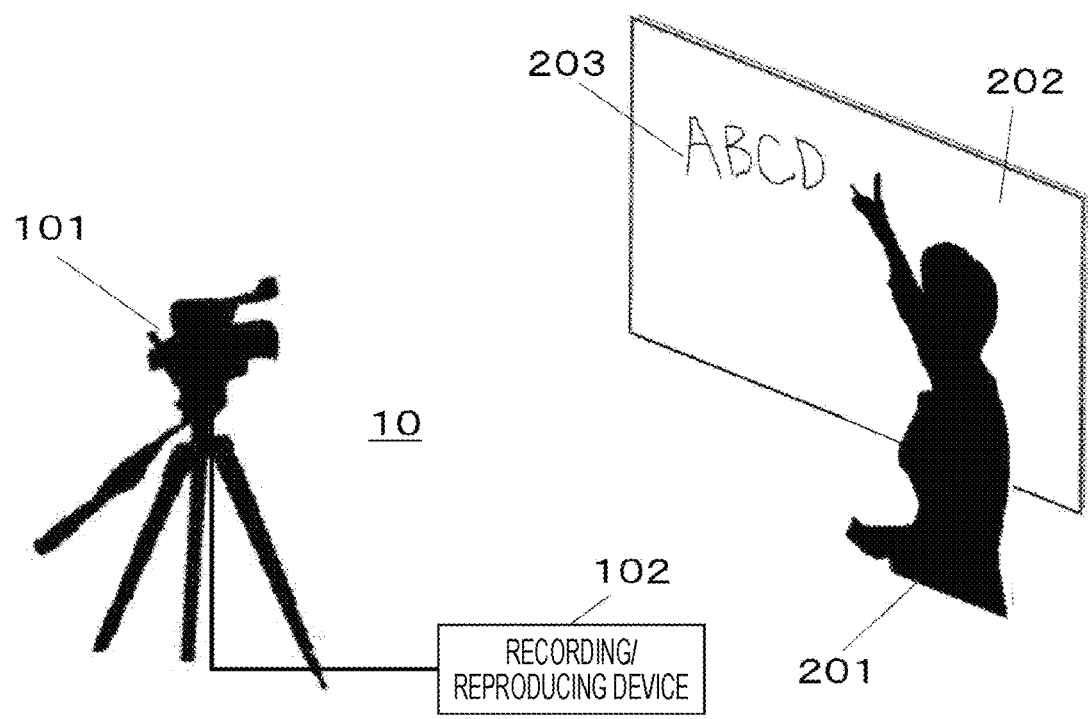
FIG. 1 is a block diagram illustrating a configuration example of a recording/reproducing system according to an embodiment.

FIG. 1 illustrates a configuration example of an image processing system 10 according to an embodiment. The image processing system 10 includes a camera 101 and a recording/reproducing device 102.

The camera 101 captures images of a state in which a person 201 who writes a description is speaking (supplement, explanation) while writing a description 203 in a description portion 202 to obtain moving image data and audio data corresponding to the moving image data. In this case, the camera 101 is fixed to have an angle of view in which the person 201 who writes a description and the description portion 202 can be imaged and is located at a position at which the speech of the person 201 who writes a description is collected.

Figure 2:
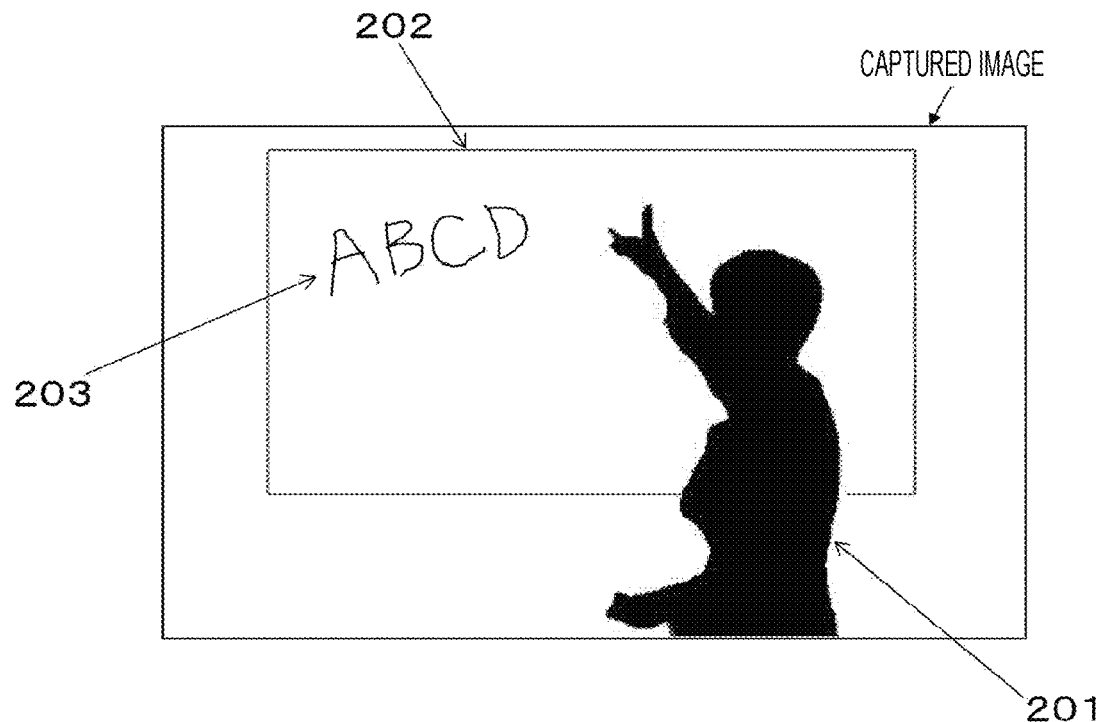
FIG. 2 is an exemplary view of an image of a certain frame captured by a camera.

FIG. 2 illustrates an example of an image of a certain frame captured by a camera 101. In this captured image, the description 203 is positioned on the upper side of the description portion 202, and the person 201 who writes a description is positioned in front of the description portion 202. When the person 201 who writes a description moves or gestures, a portion of the description 203, which is behind the person 201 who writes a description, in this frame, can also be imaged by the camera 101 in a subsequent frame.

As the person 201 who writes a description includes, for example, a person who gives a lecture, such as a professor who gives a lecture to a student in a university lecture room, a company member who gives a presentation to other members in a meeting room of the company, and the like. The description portion 202 is a writable portion, such as a white board or a blackboard and may be a writable wall portion in a lecture room or a meeting room.

The recording/reproducing device 102 performs the following processing during recording. In other words, the recording/reproducing device 102 adds a time code to moving image data and audio data which are obtained by using the camera 101 and records the data in a recording unit. Furthermore, the recording/reproducing device 102 processes moving image data obtained by using the camera 101 to determine a written portion, generates index image data for displaying, as an index description, each portion determined as the written portion, and records the index image data in a recording unit. Note that the recording unit for recording the moving image data and the audio data and the recording unit for recording the index image data may be the same or different and include, for example, a semiconductor memory.

The recording/reproducing device 102 extracts a difference value between a current frame image and a reference frame image for each pixel, grasps groups of a series of pixels having a difference value equal to or more than a threshold value, and determines whether each group has the written portion or not. Specifically, the recording/reproducing device 102 determines whether each group has the written portion or not by using a shape evaluation value, extraction time evaluation value, and stationary time evaluation value.

The recording/reproducing device 102 obtains the shape evaluation value from a relationship between the aspect ratios of a minimum square containing the group and a maximum square contained in the group. Furthermore, the image processing device 102 obtains the extraction time evaluation value on the basis of the value of a difference from the reference frame image, in a pixel included in the group, over a current frame and a plurality of frames prior to the current frame. Furthermore, the image processing device 102 obtains the stationary time evaluation value on the basis of the value of a difference from a frame image of a preceding frame, in a pixel included in the group, over a current frame and a plurality of frames prior to the current frame.

When an erased state of the portion of a description 203 in the description portion 202 is recognized more than a certain number of times for a fixed time period, the recording/reproducing device 102 determines the index image data having been generated up to that point as one item of index image data and proceeds to a process of generating new index image data. Thus, the recording/reproducing device 102 generates new index image data each time the portion of the description 203 written in the description portion 202 is completely erased by the person 201 who writes a description. Therefore, at the end of recording, in addition to the moving image data and the audio data, one item of index image data or a plurality of items of index image data (index image data group) is recorded in the recording unit.

Figure 3:
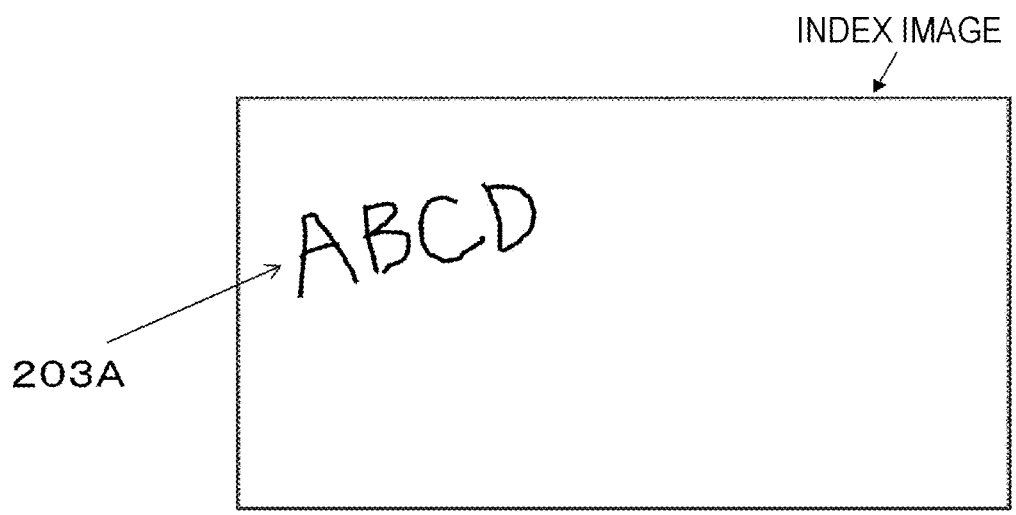
FIG. 3 is an exemplary view of an index image based on index image data.

To the index image data, a value of the time code corresponding to the time at which a description is written is added as a timestamp, in association with each pixel constituting the index description. FIG. 3 illustrates an example of an image based on the index image data, that is, an index image. This index image includes an index description 203A.

Figure 4:
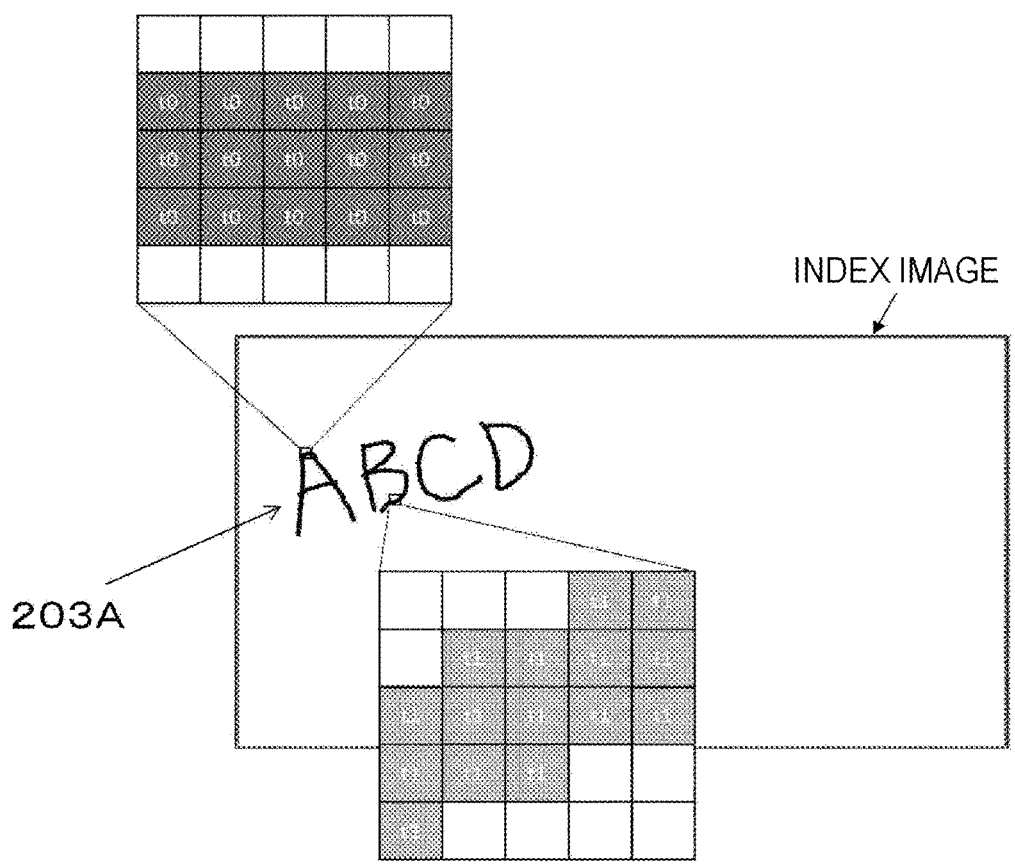
FIG. 4 is a diagram illustrating time codes corresponding to description time, having values added (embedded) as timestamps in association with pixels constituting an index description.

FIG. 4 illustrates time codes corresponding to description time, having values added (embedded) as timestamps in association with pixels constituting the index description. In the illustrated example, a timestamp "t0" corresponding to the time at which each pixel has been described is associated with each pixel constituting the top of the character "A". Furthermore, in the illustrated example, a timestamp "t1" corresponding to the time at which each pixel has been described is associated with each pixel constituting the bottom of the character "B".

Furthermore, in reproduction, the recording/reproducing device 102 performs the following processing. In other words, the recording/reproducing device 102 reads index image data from the recording unit and displays an index image having an index description, on an index-image display unit, on the basis of the index image data. In this state, when the viewer operates the user operation unit to specify the position of a desired description content of the index description in the index image, the recording/reproducing device 102 controls a reproduction start position in the moving image data and the audio data recorded in the recording unit, on the basis of the timestamp added to the index image data in association with a pixel corresponding to the specified position.

In this case, the recording/reproducing device 102 displays, as a still image, an image at the reproduction start position on a reproduced-image display unit, before starting reproduction. In this state, when the viewer operates the user operation unit to instruct reproduction, the recording/reproducing device 102 starts reproduction of the moving image data and the audio data from the reproduction start position, and starts image display and audio output.

In addition, the recording/reproducing device 102 displays thumbnail images of frames within a predetermined range including the reproduction start position, on an image list display unit, while the image at the reproduction start position is displayed, as a still image, on the image display unit. This predetermined range is defined as, for example, only a range over frames prior to the reproduction start position or a range over frames prior to and subsequent to the reproduction start position. In this state, when the viewer operates the user operation unit to select a desired thumbnail image, the recording/reproducing device 102 changes the reproduction start position to a frame position of the selected thumbnail image.

Figure 5:
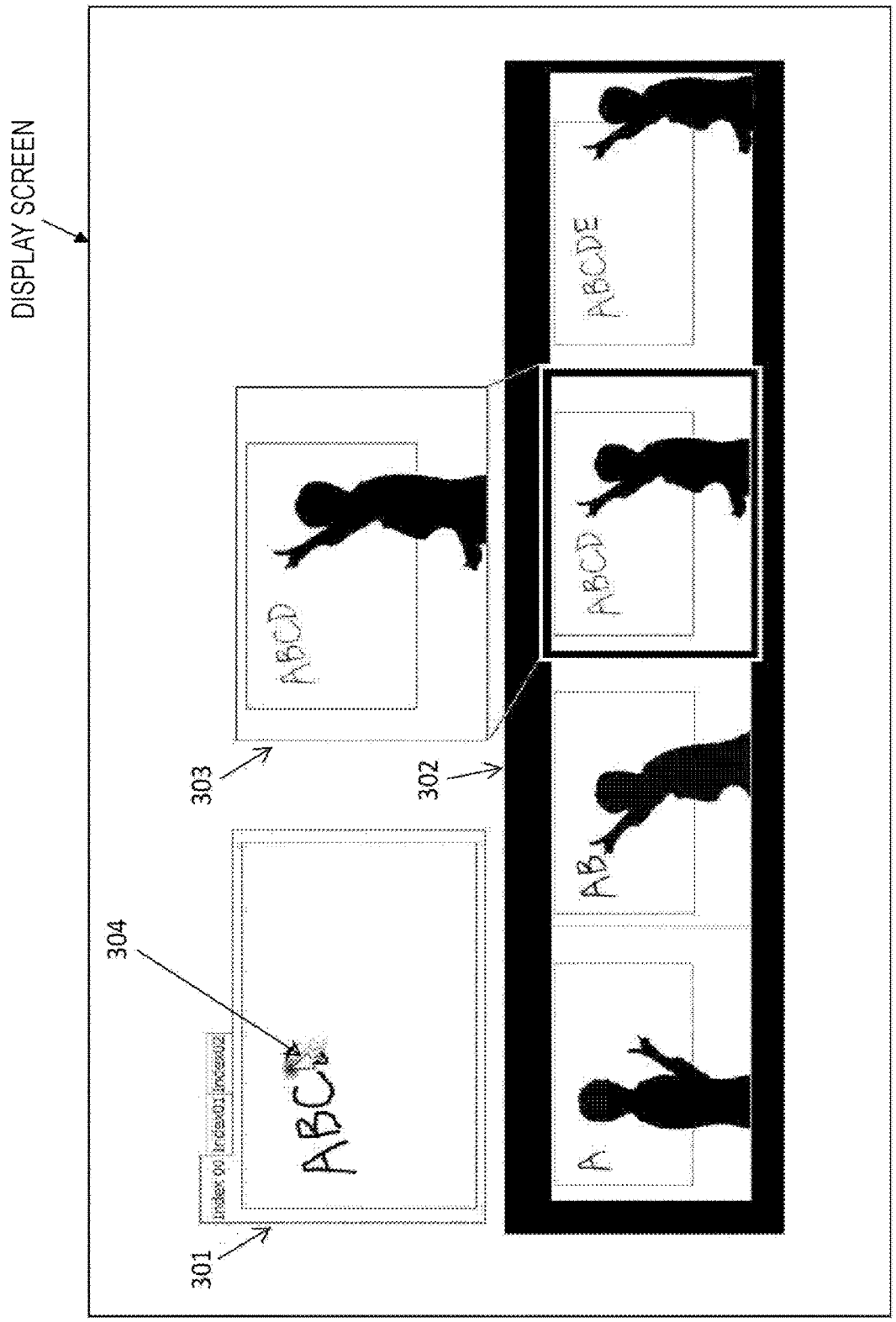
FIG. 5 is an exemplary view of a display screen upon reproduction.

FIG. 5 illustrates an example of a display screen upon reproduction. This display screen includes an index-image display unit 301, an image list display unit 302, and a reproduced-image display unit 303. As described above, the index-image display unit 301 displays an index image based on index image data. In the illustrated example, there are three index images identified by "Index 00", "Index 01", and "Index 02", and an index image of "Index 00" selected by the viewer is displayed on the front side.

Furthermore, the illustrated example shows that the viewer operates the user operation unit to specify a position (two-dimensional coordinate position) of an index description in the index image of "Index 00", indicated by a mouse pointer 304. In the reproduced-image display unit 303, a frame image having a time code value indicated by a timestamp added to the index image data in association with a pixel corresponding to the specified position is displayed, as a still image, for an image at the reproduction start position.

In the image list display unit 302, thumbnail images of frames within a predetermined range including the reproduction start position are displayed. In the illustrated example, thumbnail images within the range over frames prior to and subsequent to the reproduction start position are displayed in time series. In this state, when the viewer selects a desired thumbnail image, the reproduction start position is changed to a frame position of the selected thumbnail image, and the still image displayed in the reproduced-image display unit 303 and the thumbnail images displayed in the image list display unit 302 are changed with the change of the reproduction start position.

Note that, in the illustrated example, the thumbnail images over four frames, that is, two frames prior to the frame at the reproduction start position and one frame subsequent thereto, are displayed, but the number of frames to be displayed is not limited thereto. Furthermore, frames do not need to be displayed at an interval of one frame and may be displayed at an interval of a predetermined number of frames. Furthermore, this frame interval may be appropriately adjustable by the user.

When, while the frame image at the reproduction start position is displayed as a still image in the reproduced-image display unit 303, the viewer operates the user operation unit to instruct reproduction, reproduction of the moving image data and the audio data is started from the reproduction start position, and thus, the reproduced-image display unit 303 sequentially displays the reproduced images from the reproduction start position. In addition, in synchronization with the display of the reproduced images, reproduction sound is also output from an audio output unit, which is not illustrated.

[Configuration of Recording/Reproducing Device]

Figure 6:
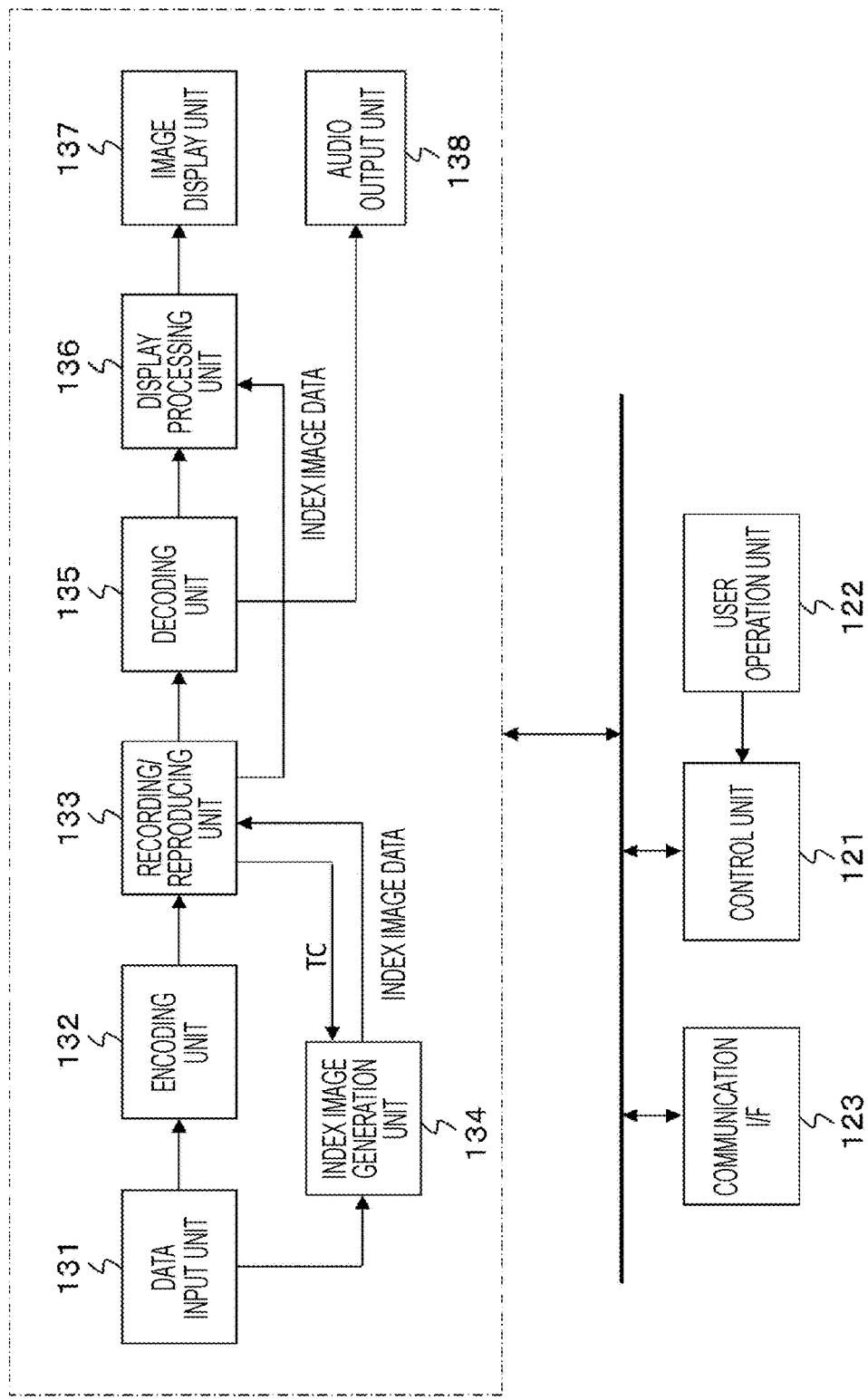
FIG. 6 is a block diagram illustrating a configuration example of a recording/reproducing device.

FIG. 6 illustrates a configuration example of the recording/reproducing device 102. The recording/reproducing device 102 includes a control unit 121, a user operation unit 122, and a communication interface (communication I/F) 123. The recording/reproducing device 102 further includes a data input unit 131, an encoding unit 132, a recording/reproducing unit 133, an index image generation unit 134, a decoding unit 135, a display processing unit 136, an image display unit 137, and an audio output unit 138.

The control unit 121 controls the operation of each unit of the recording/reproducing device 102. The user operation unit 122 constitutes a user interface and includes a key, a touch panel, a remote controller, or the like for the user (the viewer in the case of reproduction) to perform various operations. The communication interface 123 communicates with a server located on a network, such as the Internet, under the control of the control unit 121, and acquires, for example, desired information from this server.

The data input unit 131 is a portion for inputting moving image data and audio data obtained by using the camera 101. For example, the data input unit 131 may be a cable connection unit connecting the camera 101. Furthermore, for example, when the data input unit 131 is to be connected to the camera 101 with communication, the data input unit 131 may have a wireless or wired communication interface.

The encoding unit 132 encodes moving image data and audio data input to the data input unit 131. During recording, the recording/reproducing unit 133 records the encoded image and audio data obtained by the encoding unit 132, in a recording medium such as a semiconductor memory, not illustrated, with a time code TC added thereto.

Figure 7:
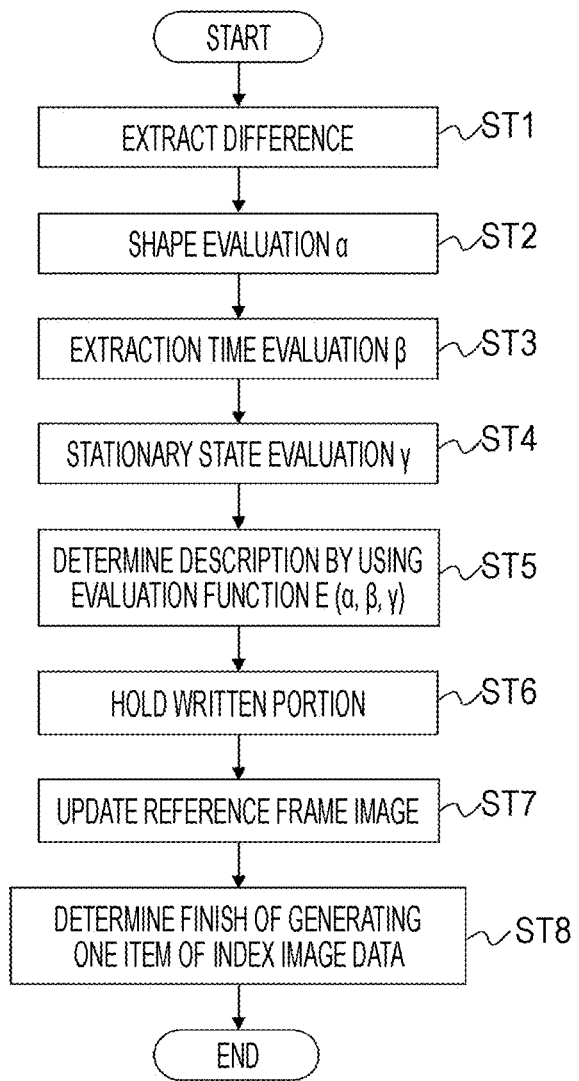
FIG. 7 is a flowchart illustrating a process in an index image generation unit.

The index image generation unit 134 processes the moving image data input to the data input unit 131, determines the portion of the description 203 written in the description portion 202, and generates index image data for displaying, as an index description, portions determined as the written portion. In this case, a value of the time code TC corresponding to description time is added to the index image data, in association with each pixel constituting the index description. The index image generation unit 134 performs, for each frame, the process from the start to the end of the flowchart of FIG. 7 by software, for example, on the basis of a program.

First, in step ST1, the index image generation unit 134 extracts a difference in each pixel between an image of a certain frame and a reference frame image (initially, a frame image in a state before writing a description in the description portion 202), extracts, from a result of difference extraction, a pixel having a large difference in pixel value, that is, a pixel having been changed from a state of the reference frame image, and grasps a group (a predetermined number of pixels) of a series of such pixels.

As described above, the group grasped in step ST1 includes the portion of the description 203, but also includes the portion of the person 201 who writes a description or the like. In the following steps, it is determined whether each group has the portion of the description 203 or not. For this determination, values of shape evaluation, extraction time evaluation, and stationary time evaluation are used.

Figure 8:
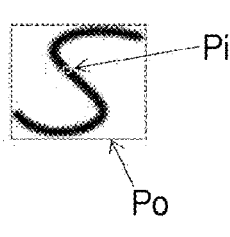
FIG. 8 is a diagram illustrating how to obtain the values in shape evaluation.
Figure 8:
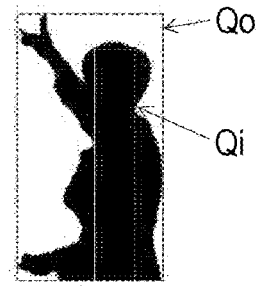

Next, in step ST2, the index image generation unit 134 obtains a value α of the shape evaluation. The index image generation unit 134 obtains this value α, on the basis of a relationship between aspect ratios of a minimum square (outer square) containing a group and the maximum square (inner square) contained in the group. FIG. 8(a) illustrates an example of a group corresponding to the portion of the description 203, and a square indicated by an arrow Po represents an outer square, and a square indicated by an arrow Pi represents an inner square. Furthermore, FIG. 8(b) illustrates an example of a group corresponding to the portion of the person 201 who writes a description, and a square indicated by an arrow Qo represents an outer square, and a square indicated by an arrow Qi represents an inner square.

In a case of a group corresponding to the portion of the description 203, the inner square (Pi) is smaller than the outer square (Po), and the value α of the shape evaluation becomes larger. On the other hand, a group corresponding to the portion of the person 201 who writes a description is larger than the group corresponding to the portion of the description 203, and the inner square (Qi) also has a certain size compared to the outer square (Qo). Therefore, the value α of the shape evaluation becomes smaller.

Next, in step ST3, the index image generation unit 134 obtains a value β of the extraction time evaluation. The index image generation unit 134 obtains this value β on the basis of the value of a difference from the reference frame image, in a pixel included in the group, over a current frame and a plurality of frames prior to the current frame, and as the number of frames having a large value of a difference increases, the value β becomes larger.

For example, the index image generation unit 134 determines whether a frame (difference extraction frame) has a large difference from the reference frame image, for pixels (all pixels or some pixels) included in the group, accumulates the results of the determination, and defines the number of continuous difference extraction frames (for example, an average value, if this evaluation is performed on a plurality of pixels) as an evaluation value β.

In the case of the portion of the description 203, a large difference is kept extracted after writing, the evaluation value β becomes larger. On the other hand, in the case of a moving portion such as the person 201 who writes a description, when the person 201 who writes a description has passed, extraction of a large difference is interrupted, and the evaluation value β becomes smaller. However, when the person 201 who writes a description stays without moving, the evaluation value β may become larger in spite of the portion of the person 201 who writes a description.

Next, in step ST4, the index image generation unit 134 obtains a value γ of the stationary state evaluation. The index image generation unit 134 obtains this value γ on the basis of the value of a difference from a frame image of a preceding frame, in a pixel included in the group, over a current frame and a plurality of frames prior to the current frame, and as the number of frames having a large value of a difference increases, the value γ becomes larger.

For example, the index image generation unit 134 accumulates a pixel difference from a preceding frame for pixels (all pixels or some pixels) included in the group and determines the reciprocal of the value of the pixel difference (for example, an average value, if this evaluation is performed on a plurality of pixels) as an evaluation value γ.

In the case of the portion of the description 203, the value of a pixel difference from an image of the preceding frame is zero or small, and the evaluation value γ becomes larger. On the other hand, in the case of the portion of the person 201 who writes a description where the person moves or gestures, the value of a pixel difference from the image of the preceding frame is large, and the evaluation value γ becomes smaller.

Next, in step ST5, the index image generation unit 134 substitutes the values α, β, and γ of the respective evaluations obtained in steps ST2 to ST4 in an evaluation function E (α, β, γ) to obtain an evaluation value for determining whether there is the description or not. Then, in step ST5, when the evaluation value is larger than a threshold value THr, the index image generation unit 134 determines that the group has a written portion (the portion of the description 203).

Next, in step ST6, the index image generation unit 134 holds each pixel included in the group determined as the written portion in step ST5, as a pixel of an index description. Note that, the group determined as the written portion in this way also includes a group including pixels having been held before as the written portion. This group is recognized to be erased after that and is not held again as the pixels of the index description.

Here, the word "hold" means, for example, to write and hold the value of each pixel included in a group determined as the written portion, to a corresponding pixel position of a frame memory. Here, instead of writing the value itself of each pixel included in the group determined as the written portion, to the corresponding pixel position of the frame memory, only information on the pixel position of each pixel included in the group determined as the written portion may be held.

When holding each pixel included in the group determined as the written portion as a pixel of the index description, the index image generation unit 134 adds, as the time stamp, the value of a time code corresponding to description time, for example, a value of the time code TC at the time point at which the group is determined as the written portion, in association with each pixel (see FIG. 4).

Next, in step ST7, the index image generation unit 134 generates a frame image in which the value of each pixel currently held as the index description has a value corresponding to the description 203 and the frame image is changed to a new reference frame image. In description determination processing in the next frame, the reference frame image thus updated in this way is used.

Next, in step ST8, the index image generation unit 134 determines the end of generation of one item of index image data. In this case, when the erased state described above is recognized a certain number of times or more for a fixed time period, it is determined that generation of one item of index image data is finished, determining the index image data having been generated up to that point as one item of index image data, the process proceeds to the generation of new index image data. The index image generation unit 134 also determines that generation of one item of index image data is finished at the end of recording of moving image data and audio data, and determines the index image data having been generated up to that point as one item of index image data.

Returning to FIG. 6, during recording, the recording/reproducing unit 133 adds the time code TC to the encoded image and audio data obtained by the encoding unit 132 as described above and records the data in the recording medium and records, in the recording medium, a predetermined number of items of index image data generated by the index image generation unit 134.

Furthermore, in reproduction, the recording/reproducing unit 133 reproduces a predetermined number of items of index image data from the recording medium and transmits the index image data to the display processing unit 136. In addition, in response to an operation from the viewer for specification of a reproduction start position, reproduction instruction, or the like, the recording/reproducing unit 133 reproduces the encoded image and audio data required for image display or audio output, from the recording medium, under the control of the control unit 133 and transmits the data to the decoding unit 133. The decoding unit 135 decodes the encoded image and audio data to obtain image data and audio data.

On the basis of the image data obtained by the decoding unit 135 and the index image data obtained by the recording/reproducing unit 133, and further in response to the operation of the viewer from the user operation unit 122, the display processing unit 136 generates display image data for obtaining the display screen (see FIG. 5), under the control of the control unit 121. The image display unit 137 presents the display screen based on the display image data obtained by the display processing unit 136. Furthermore, the audio output unit 138 outputs an audio based on the audio data obtained by the decoding unit 135.

A brief description will be given of the operation of the recording/reproducing device illustrated in FIG. 6. Firstly, the operation during recording will be described. Moving image data and audio data which are obtained by the camera 101 are input to the data input unit 131. The moving image data and audio data are supplied to the encoding unit 132 and encoded. The encoded image and audio data are supplied to the recording/reproducing unit 133 and recorded in the recording medium after a time code TC is added.

Furthermore, the moving image data input from the camera 101 to the data input unit 131 is supplied to the index image generation unit 134. In the index image generation unit 134, the moving image data is processed to determine the portion of a description 203 written into the description portion 202, and index image data is generated to display the portions determined as the written portion as an index description. The index image data is supplied to the recording/reproducing unit 133 and recorded in the recording medium.

Next, the operation during reproduction will be described. In the recording/reproducing unit 133, the index image data is reproduced from the recording medium and supplied to the display processing unit 136. In the display processing unit 136, on the basis of the index image data, display image data is generated to display an index image in the index-image display unit 301 of the display screen. The display image data is supplied to the image display unit 137, and the display screen on which the index image is displayed is presented in the index-image display unit 301.

In this state, when the viewer operates the user operation unit 122 to specify a desired position (two-dimensional coordinate position) of the index description in the index image, the control unit 121 recognizes that a frame having a time code value indicated by a timestamp added to the index image data in association with a pixel corresponding to the specified position is a reproduction start position.

At this time, in the recording/reproducing unit 133, under the control of the control unit 121, the encoded image data of a frame at the reproduction start position and frames prior to and subsequent to the frame are reproduced, and the encoded image data is decoded by the encoding unit 135 to be supplied to the display processing unit 136. In the display processing unit 136, on the basis of the image data of each frame, display image data is generated to display, as a still image, an image at the reproduction start position in the reproduced-image display unit 303 of the display screen, and to display thumbnail images of the frames prior to and subsequent to the reproduction start position in the image list display unit 302.

The display image data is supplied to the image display unit 137 and presents the display screen (see FIG. 5) in which the index image is displayed in the index-image display unit 301, the image at the reproduction start position is displayed in the reproduced-image display unit 303, and the thumbnail images of the frames prior to and subsequent to the reproduction start position are displayed in time series in the image list display unit 302.

In this state, when the viewer operates the user operation unit 122 to select a thumbnail image different from a thumbnail image at the reproduction start position, the control unit 121 recognizes that the reproduction start position is changed to the frame position of the selected thumbnail image. At this time, in the recording/reproducing unit 133, under the control of the control unit 121, the encoded image data of a frame at the changed reproduction start position and frames prior to and subsequent to the frame are reproduced, and the encoded image data is decoded by the encoding unit 135 to be supplied to the display processing unit 136. Thus, in the display screen presented on the image display unit 137, image display in the reproduced-image display unit 303 and the image list display unit 302 corresponds to the changed reproduction start position.

When, while the image at the reproduction start position is displayed as a still image in the reproduced-image display unit 303, the viewer operates the user operation unit 122 to instruct reproduction, the recording/reproducing unit 133 reproduces, under the control of the control unit 121, encoded image and audio data from the reproduction start position, the encoded image and audio data are decoded by the decoding unit 135, and moving image data and audio data are obtained.

The moving image data obtained by the decoding unit 135 is supplied to the display processing unit 136. In the display processing unit 136, on the basis of the moving image data, display image data is generated to display a moving image in the reproduced-image display unit 303 of the display screen. The display image data is supplied to the image display unit 137, and the display screen on which the moving image is displayed is presented in the reproduced-image display unit 303. Note that, in this case, the moving image may be displayed all over the display screen presented on the image display unit 137.

Furthermore, the audio data obtained by the decoding unit 135 is supplied to the audio output unit 138. The audio output unit 138 is configured to provide an audio output corresponding to the moving image data displayed on the image display unit 137.

Note that, when reproduction from another reproduction start position is desired, the viewer preferably selects a desired index image in the index-image display unit 301 on the display screen presented on the image display unit 137 and performs an operation to specify a desired position of the index description in the selected index image.

As described above, in a recording/reproducing system 10 illustrated in FIG. 1, the recording/reproducing device 102 is configured to record, upon recording, an index image data generated to display, as an index description, each portion determined as a written portion determined by processing moving image data, and further the recording/reproducing device 102 is configured to add, as a timestamp, a value of a time code corresponding to description time in association with each pixel constituting the index description to the index image data. Thus, upon reproduction, the index image data is used to display an index image having an index description, and a viewer is able to specify an appropriate position on the basis of the content of an index description to readily reach an image/audio reproduction start position corresponding to description time corresponding to the specified position.

Furthermore, in the recording/reproducing system 10 illustrated in FIG. 1, the recording/reproducing device 102 is configured so that, upon reproduction, an index image having an index description is displayed on the basis of index image data and an appropriate position of the index description is specified, and the reproduction start positions in moving image data and audio data are controlled on the basis of a timestamp added to the index image data in association with a pixel corresponding to the specified position. Therefore, the viewer can specify an appropriate position on the basis of the content of an index description to readily and accurately reach an image/audio reproduction start position corresponding to description time corresponding to the specified position.

Furthermore, in the recording/reproducing system 10 illustrated in FIG. 1, the recording/reproducing device 102 is configured so that, upon reproduction, an image at a reproduction start position is displayed as a still image in the reproduced-image display unit 303 before the reproduction is started, and in response to a reproduction instruction from the viewer, the reproduction of moving image data and audio data is started from the reproduction start position. Thus, the viewer is able to issue a reproduction instruction after confirming the image at the reproduction start position.

Furthermore, in the recording/reproducing system 10 illustrated in FIG. 1, the recording/reproducing device 102 is configured so that, upon reproduction, while an image at a reproduction start position is displayed as a still image in the reproduced-image display unit 303, thumbnail images of frames within a predetermined range including the reproduction start position are displayed in the image list display unit 302, and when the viewer selects a predetermined thumbnail image, the reproduction start position is changed to the position of a frame of the selected thumbnail image. Thus, the viewer can easily and appropriately change the reproduction start position with reference to the thumbnail images.

For example, upon recording sounds and images of lectures, it is expected that the amount of image/audio recorded will continue to increase as the number of lectures increases, and total recording time will be enormous. Upon browsing, it is impossible to review the huge amount of image/audio recorded, requiring accurate and quick browsing of a necessary portion.

In the present technology, the contents of descriptions written by the person who writes a description are projected in the index images, and thus, viewing the index images enables to grasp an outline of the whole image. Furthermore, on the basis of the content of a description showing an item for which details in the index image are desired to be browsed, the image/audio of the desired content can be immediately browsed. The image/audio may help the viewer to understand the lecture, leading to understanding of the content in a shorter time.

Furthermore, for example, upon recording a meeting, the record helps quick browsing of a portion of the content of the meeting required later, increasing efficiency and reducing man-hour even in a business situation.

2. Modifications

Note that, in the above embodiment, it has been described that, to the index image data, the value of a time code corresponding to description time is added as a timestamp, in association with each pixel constituting an index description. Character recognition may be performed on the index description included in the index image to recognize a word, and further, data (text data) on the recognized word may be added to the index image data, in association with each pixel constituting the index description corresponding to the word.

Figure 9:
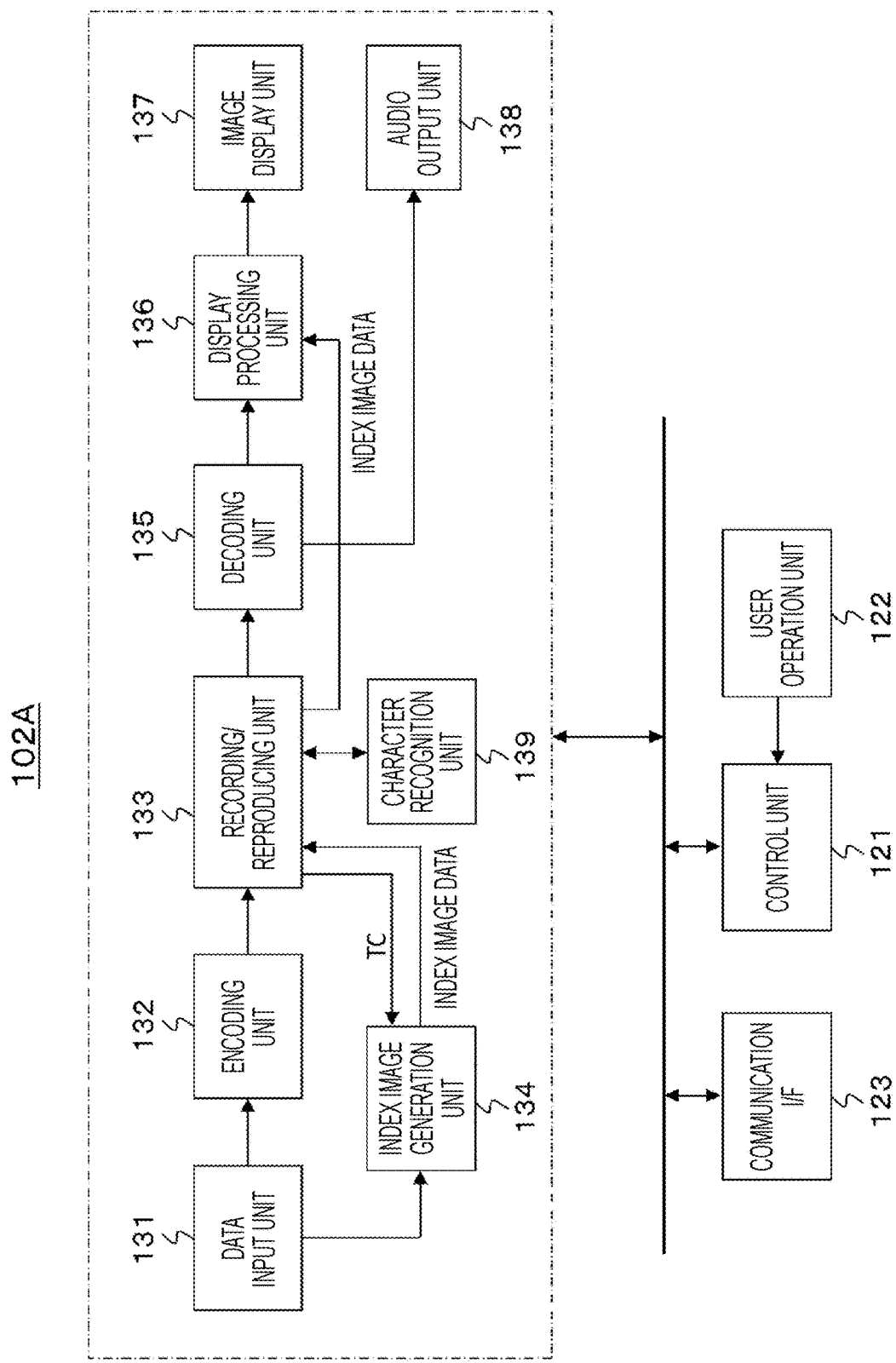
FIG. 9 is a block diagram illustrating a configuration example of a recording/reproducing device where character recognition is performed on an index description included in an index image.

FIG. 9 illustrates a configuration example of a recording/reproducing device 102A where character recognition is performed on an index description included in an index image. The recording/reproducing device 102A is configured similar to the recording/reproducing device 102A illustrated in FIG. 6 and further includes a character recognition unit 139.

Under the control of the control unit 121, the character recognition unit 139 reads index image data recorded in the recording medium of the recording/reproducing unit 133 and, on the basis of the index image data, performs character recognition processing on an index description included in an index image to recognize a word included in the index description. Furthermore, in the character recognition unit 139, data (text data) on the recognized word is further added to the index image data, in association with each pixel constituting the index description corresponding to the word. The index image data to which the data on the word is added in this way is supplied to the recording/reproducing unit 133 and recorded in the recording medium again, and the index image data is held.

Adding the data on the word included in the index description to the index image data enables, for example, to continuously reproduce all images corresponding to appearance time with a word having high appearance frequency as a trigger or enables to display the meaning of the word or a related image as reference information. This reference information is acquired, for example, from a server on the Internet by the communication interface 123.

Figure 10:
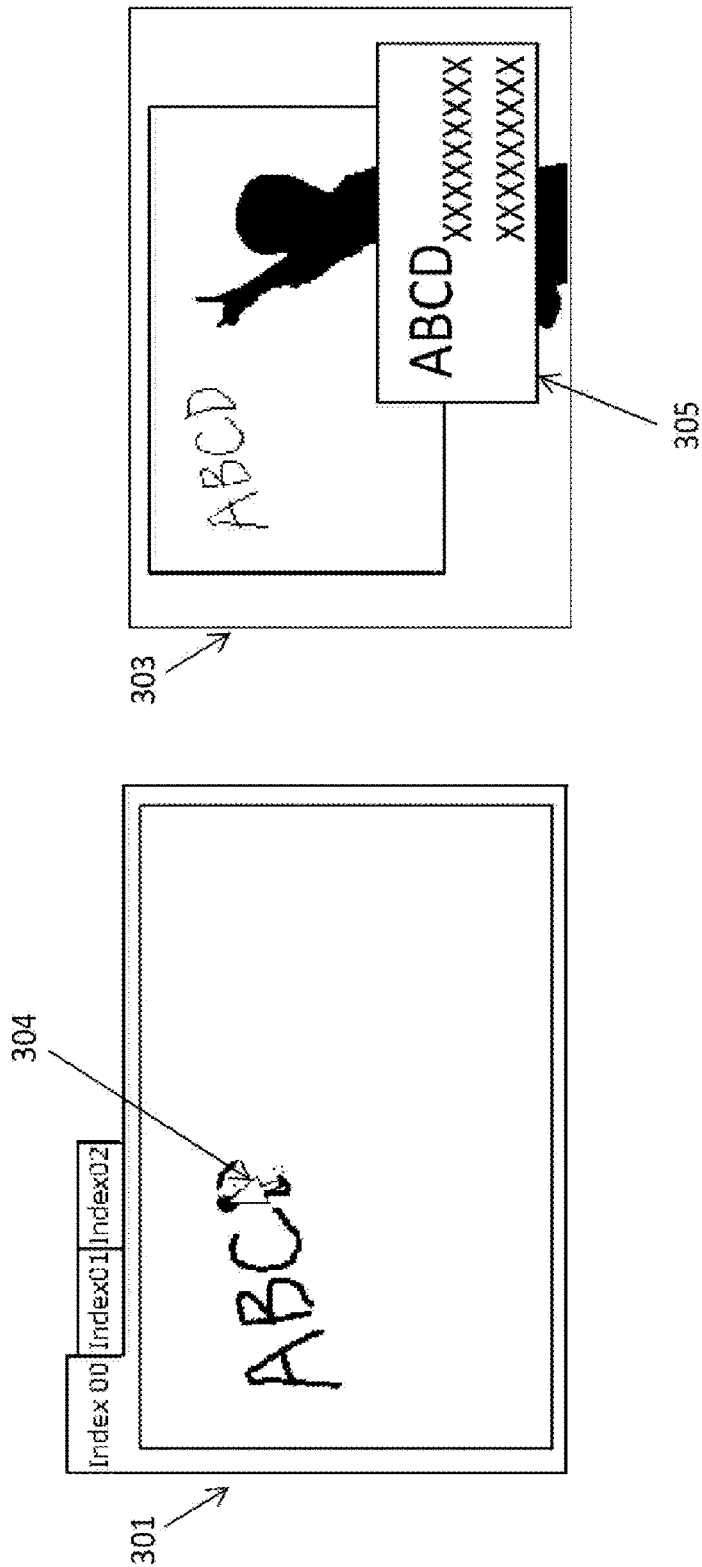
FIG. 10 is an explanatory view of reference information displayed on the basis of data on a word added to index image data.

FIG. 10 illustrates an example of display of reference information. The illustrated example shows that the viewer operates the user operation unit to specify a position (two-dimensional coordinate position) of an index description in the index image of "Index 00", indicated by the mouse pointer 304. In this case, in the reproduced-image display unit 303, a frame image having a time code value indicated by a timestamp added to the index image data in association with a pixel corresponding to the specified position is displayed, as a still image, for an image at the reproduction start position.

Furthermore, the illustrated example shows that data on the word "ABCD" is added in association with a pixel corresponding to the specified position. Therefore, reference information relating to the word "ABCD" is acquired, and a reference information image 305 is displayed to be superimposed itself on the reproduced-image display unit 303. Note that, in the illustrated example, the viewer specifies the portion of the character "D", but, for example, even when the viewer specifies any of characters "A" to "C", data of the word "ABCD" is added to the index image data, in association with the characters, and the reference information is displayed in a similar manner.

Furthermore, for example, the addition of the data of a word included in the index description to the index image data may make possible detection in the index image or detection between index images for specifying a portion of a recognized word in a recorded moving image. In this case, in the image list display unit 302 of FIG. 5, not the time-series thumbnail images but a thumbnail image of a frame at the reproduction start position corresponding to a position specified by the viewer and a thumbnail image of another frame in which a word the same as the word at the specified position are displayed, side by side. Then, when a desired thumbnail image is selected by the viewer, the reproduction start position is changed to the position of the frame of the selected thumbnail image.

Note that, as described above, in a case where data (text data) on a recognized word is added to the index image data, in association with each pixel constituting the index description corresponding to the word, the value of a time code TC corresponding to one or more other frames where the same word appears may be added as the timestamp.

Furthermore, in the above embodiment, the moving image data obtained by imaging a state in which the person 201 who writes a description is explaining while writing a description 203 in the description portion 202, such as a white board or a blackboard, is processed, but other similar moving image data may also be processed. For example, moving image data obtained by imaging a state in which the person who writes a description is explaining while writing a description on paper on a desk may be processed in a similar manner to facilitate reproduction.

In addition, a description on the description portion 202 is not limited to only characters and may be a figure or a mark and the description is not limited to a written description but may be displays placed on the description portion 202.

Furthermore, the present technology may also include the following configurations.

(1) A recording device including:

an image/audio recording unit for adding a time code to moving image data obtained by imaging a state in which a person who writes a description is explaining while writing a description in a description portion, and audio data corresponding to the moving image data to record the data in a recording unit; and an index-image recording unit for processing the moving image data, determining a written portion in the description portion, generating index image data for displaying, as an index description, portions determined as the written portion, and recording the index image data in a recording unit, in which, to the index image data, a value of the time code corresponding to description time is added as a timestamp, in association with pixels constituting the index description.

(2) The recording device according to (1), in which the index-image recording unit extracts a difference value between a current frame image and a reference frame image for each pixel, grasps groups of a series of pixels having a difference value equal to or more than a threshold value, and determines whether each group has the written portion or not.

(3) The recording device according to (2), in which the index-image recording unit determines whether each of the groups has the written portion or not by using a shape evaluation value, extraction time evaluation value, and stationary time evaluation value, and the index-image recording unit determines the shape evaluation value on the basis of a relationship between the aspect ratios of a minimum square containing the group and a maximum square contained in the group, obtains the extraction time evaluation value on the basis of the value of a difference from the reference frame image, in a pixel included in the group, over a current frame and a plurality of frames prior to the current frame, and obtains the stationary time evaluation value on the basis of the value of a difference from a frame image of a preceding frame, in a pixel included in the group, over a current frame and a plurality of frames prior to the current frame.

(4) The recording device according to any of (1) to (3), in which the index-image recording unit, when an erased state of a written portion in the description portion is recognized more than a certain number of times for a fixed time period, determines the index image data having been generated up to that point as one item of index image data and shifts to a process of generating new index image data.

(5) The recording device according to any of (1) to (4), further including a character recognition unit to perform character recognition on an index description to recognize a word, in which the index image data includes data on this word in association with each pixel constituting the index description corresponding to the recognized word.

(6) A recording method including:

an image/audio recording step of adding a time code to moving image data obtained by imaging a state in which a person who writes a description is explaining while writing a description in a description portion, and audio data corresponding to the moving image data to record the data in a recording unit, by using an image/audio recording unit; and an index-image recording step of processing the moving image data, determining a written portion in the description portion, generating index image data for displaying, as an index description, portions determined as the written portion, and recording the index image data in a recording unit, by using an index-image recording unit, in which, to the index image data, a value of the time code corresponding to description time is added as a timestamp, in association with pixels constituting the index description.

(7) A reproducing device including an index-image display control unit for reading index image data from a recording unit to display, on an index-image display unit, an index image having an index description, on a basis of the index image data, the index image data including a value of a time code value, added as a timestamp, corresponding to description time in association with each pixel constituting the index description;

a user operation unit for specifying an appropriate position of an index description of an index image displayed on the display unit; and a reproduction control unit for controlling a reproduction start position in moving image data and audio data recorded in a recording unit on a basis of the timestamp added to the index image data in association with a pixel corresponding to the specified position.

(8) The reproducing device according to (7), in which the reproduction control unit displays, as a still image, an image at the reproduction start position on a reproduced-image display unit, before starting reproduction.

(9) The reproducing device according to (8), in which the reproduction control unit, when receiving a reproduction instruction from the user operation unit while an image corresponding to a reproduction start position is displayed as a still image on the reproduced-image display unit, starts reproduction of the moving image data and the audio data, from the reproduction start position.

(10) The reproducing device according to (8) or (9), in which
the reproduction control unit
displays, on an image list display unit, thumbnail images of frames within a predetermined range including the reproduction start position while an image at a reproduction start position is displayed as a still image on the reproduced-image display unit.

(11) The reproducing device according to (10), in which
the reproduction control unit,
when a predetermined thumbnail image is selected from the user operation unit, changes a reproduction start position to a position of a frame of this thumbnail image.

(12) The reproducing device according to any of (8) to (11), in which
in association with each pixel constituting an index description corresponding to a word recognized using character recognition, data on the word is added to the index image data,
the reproducing device further includes an information acquisition unit for acquiring, in association with a pixel corresponding to a position designated by the user operation unit, on the basis of data on a word added to the index image data, information relating to the word, and
the reproduction control unit
displays the acquired information over the image at to the reproduction start position.

(13) The reproducing device according to any of (8) to (12), in which
in association with each pixel constituting an index description corresponding to a word recognized using character recognition, data on the word is added to the index image data, and the reproduction control unit, and
the reproduction control unit,
together with a thumbnail image of a frame corresponding to the reproduction start position, while an image at a reproduction start position is displayed as a still image on the image display unit, displays, in an image list display unit, a thumbnail image at a position of a timestamp added in association with a pixel corresponding to another position with which data on a word the same as data on a word added in association with a pixel corresponding to the specified position is added in association.

(14) The reproducing device according to (13), in which
the reproduction control unit,
when a predetermined thumbnail image is selected from the user operation unit, changes a reproduction start position to a position of a frame of this thumbnail image.

(15) A reproducing method including:
an index-image display control step of reading index image data from a recording unit to display, on a display unit, an index image having an index description, on the basis of the index image data, by using an index-image display control unit, the index image data including a value of the time code value, added as a timestamp, corresponding to description time in association with each pixel constituting the index description; and
a reproduction control step of controlling a reproduction start position in moving image data and audio data recorded in a recording unit on the basis of a timestamp added to the index image data in association with a pixel corresponding to the specified position, in response to specification of an appropriate position of an index description of an index image displayed on the display unit, by using a reproduction control unit.

(16) A recording/reproducing device including:
an image/audio recording unit for adding a time code to moving image data obtained by imaging a state in which a person who writes a description is explaining while writing a description in a description portion, and audio data corresponding to the moving image data to record the data in a first recording unit;
an index-image recording unit for processing the moving image data, determining a written portion in the description portion, generating index image data for displaying, as an index description, portions determined as the written portion, and recording the index image data in a second recording unit, the index image data including a value of the time code value, added as a timestamp, corresponding to description time in association with each pixel constituting the index description;
an index-image display control unit for reading index image data from the second recording unit to display, on a display unit, an index image having an index description, on the basis of the index image data;
a user operation unit for specifying an appropriate position of an index description of an index image displayed on the display unit; and
a reproduction control unit for controlling a reproduction start position in moving image data and audio data recorded in the first recording unit on the basis of the timestamp added to the index image data in association with a pixel corresponding to the specified position.

REFERENCE SIGNS LIST

10 Recording/reproducing system
101 Camera
102, 102A Recording/reproducing device
121 Control unit
122 User operation unit
123 Communication interface
131 Data input unit
132 Encoding unit
133 Recording/reproducing unit
134 Index image generation unit
135 Decoding unit
136 Display processing unit
137 Image display unit
138 Audio output unit
139 Character recognition unit
301 Index-image display unit
302 Reproduced-image display unit
303 Image list display unit
304 Mouse pointer
305 Reference information image

The invention claimed is:

1. A recording device comprising:
an image/audio recording unit for adding a time code to moving image data obtained by imaging a state in which a person who writes a description is explaining while writing a description in a description portion, and audio data corresponding to the moving image data to record the data in a recording unit; and
an index-image recording unit for processing the moving image data, determining a written portion in the description portion, generating index image data for displaying, as an index description, portions determined as the written portion, and recording the index image data in a recording unit,
wherein, to the index image data, a value of the time code corresponding to description time is added as a timestamp, in association with pixels constituting the index description.

2. The recording device according to claim 1, wherein the index-image recording unit
extracts a difference value between a current frame image and a reference frame image for each pixel, grasps groups of a series of pixels having a difference value equal to or more than a threshold value, and determines whether each group has the written portion or not.

3. The recording device according to claim 2, wherein the index-image recording unit determines whether each of the groups has the written portion or not by using a shape evaluation value, extraction time evaluation value, and stationary time evaluation value, and
the index-image recording unit
determines the shape evaluation value on a basis of a relationship between aspect ratios of a minimum square containing the group and a maximum square contained in the group,
obtains the extraction time evaluation value on a basis of a value of a difference from the reference frame image, in a pixel included in the group, over a current frame and a plurality of frames prior to the current frame, and
obtains the stationary time evaluation value on a basis of a value of a difference from a frame image of a preceding frame, in a pixel included in the group, over a current frame and a plurality of frames prior to the current frame.

4. The recording device according to claim 1, wherein the index-image recording unit,
when an erased state of a written portion in the description portion is recognized more than a certain number of times for a fixed time period, determines the index image data having been generated up to that point as one item of index image data and shifts to a process of generating new index image data.

5. The recording device according to claim 1, further comprising
a character recognition unit to perform character recognition on an index description to recognize a word,
wherein the index image data includes data on this word in association with each pixel constituting the index description corresponding to the recognized word.

6. A recording method comprising:
an image/audio recording step of adding a time code to moving image data obtained by imaging a state in which a person who writes a description is explaining while writing a description in a description portion, and audio data corresponding to the moving image data to record the data in a recording unit, by using an image/audio recording unit; and
an index-image recording step of processing the moving image data, determining a written portion in the description portion, generating index image data for displaying, as an index description, portions determined as the written portion, and recording the index image data in a recording unit, by using an index-image recording unit,
wherein, to the index image data, a value of the time code corresponding to description time is added as a timestamp, in association with pixels constituting the index description.

7. A reproducing device comprising:
an index-image display control unit for reading index image data from a recording unit to display, on an index-image display unit, an index image having an index description, on a basis of the index image data, the index image data including a value of a time code value, added as a timestamp, corresponding to description time in association with each pixel constituting the index description;
a user operation unit for specifying an appropriate position of an index description of an index image displayed on the display unit; and
a reproduction control unit for controlling a reproduction start position in moving image data and audio data recorded in a recording unit on a basis of the timestamp added to the index image data in association with a pixel corresponding to the specified position.

8. The reproducing device according to claim 7, wherein the reproduction control unit
displays, as a still image, an image at the reproduction start position on a reproduced-image display unit, before starting reproduction.

9. The reproducing device according to claim 8, wherein the reproduction control unit, when receiving a reproduction instruction from the user operation unit while an image at a reproduction start position is displayed as a still image on the reproduced-image display unit, starts reproduction of the moving image data and the audio data, from the reproduction start position.

10. The reproducing device according to claim 8, wherein the reproduction control unit
displays, on an image list display unit, thumbnail images of frames within a predetermined range including the reproduction start position while an image at a reproduction start position is displayed as a still image on the reproduced-image display unit.

11. The reproducing device according to claim 10, wherein
the reproduction control unit,
when a predetermined thumbnail image is selected from the user operation unit, changes a reproduction start position to a position of a frame of this thumbnail image.

12. The reproducing device according to claim 8, wherein
in association with each pixel constituting an index description corresponding to a word recognized using character recognition, data on the word is added to the index image data,
the reproducing device further comprises an information acquisition unit for acquiring, in association with a pixel corresponding to a position designated by the user operation unit, on a basis of data on a word added to the index image data, information relating to the word, and
the reproduction control unit
displays the acquired information over the image at the reproduction start position.

13. The reproducing device according to claim 8, wherein
in association with each pixel constituting an index description corresponding to a word recognized using character recognition, data on the word is added to the index image data, and
the reproduction control unit,
together with a thumbnail image of a frame corresponding to the reproduction start position, while an image at a reproduction start position is displayed as a still image on the image display unit, displays, in an image list display unit, a thumbnail image at a position of a timestamp added in association with a pixel corresponding to another position with which data on a word the same as data on a word added in association with a pixel corresponding to the specified position is added in association.

14. The reproducing device according to claim 13, wherein
the reproduction control unit,
when a predetermined thumbnail image is selected from the user operation unit, changes a reproduction start position to a position of a frame of this thumbnail image.

15. A reproducing method comprising:
an index-image display control step of reading index image data from a recording unit to display, on a display unit, an index image having an index description, on a basis of the index image data, by using an index-image display control unit, the index image data including a value of the time code value, added as a timestamp, corresponding to description time in association with each pixel constituting the index description; and
a reproduction control step of controlling a reproduction start position in moving image data and audio data recorded in a recording unit on a basis of a timestamp added to the index image data in association with a pixel corresponding to the specified position, in response to specification of an appropriate position of an index description of an index image displayed on the display unit, by using a reproduction control unit.

16. A recording/reproducing device comprising:
an image/audio recording unit for adding a time code to moving image data obtained by imaging a state in which a person who writes a description is explaining while writing a description in a description portion, and audio data corresponding to the moving image data to record the data in a first recording unit;
an index-image recording unit for processing the moving image data, determining a written portion in the description portion, generating index image data for displaying, as an index description, portions determined as the written portion, and recording the index image data in a second recording unit, the index image data including a value of the time code value, added as a timestamp, corresponding to description time in association with each pixel constituting the index description;
an index-image display control unit for reading index image data from the second recording unit to display, on a display unit, an index image having an index description, on a basis of the index image data;
a user operation unit for specifying an appropriate position of an index description of an index image displayed on the display unit; and
a reproduction control unit for controlling a reproduction start position in moving image data and audio data recorded in the first recording unit on a basis of the timestamp added to the index image data in association with a pixel corresponding to the specified position.

\* \* \* \* \*